(No Model.) 2 Sheets—Sheet 1.

O. F. VAUGHAN.
STUMP EXTRACTOR.

No. 582,705. Patented May 18, 1897.

Witnesses
E. N. Monroe
H. F. Ennis

Inventor
Oscar F. Vaughan.
By H. B. Willson.
Attorney (No Model.) 2 Sheets—Sheet 2.

O. F. VAUGHAN.
STUMP EXTRACTOR.

No. 582,705. Patented May 18, 1897.

Witnesses

Inventor
Oscar F. Vaughan.
By H. B. Willson.
Attorney

UNITED STATES PATENT OFFICE.

OSCAR FLEMING VAUGHAN, OF SHANNON, MISSISSIPPI.

STUMP-EXTRACTOR.

SPECIFICATION forming part of Letters Patent No. 582,705, dated May 18, 1897.

Application filed October 21, 1896. Serial No. 609,609. (No model.)

*To all whom it may concern:*

Be it known that I, OSCAR FLEMING VAUGHAN, a citizen of the United States, residing at Shannon, in the county of Lee and State of Mississippi, have invented certain new and useful Improvements in Stump-Extractors; and I do declare the following to be a full, clear, and exact description of the invention, such as will enable others skilled in the art to which it appertains to make and use the same.

My invention has relation to improvements in stump-extractors, and the object is to provide a simple and durable as well as portable and powerful device of this kind; and to this end the novelty consists in the construction, combination, and arrangement of the same, as will be hereinafter more fully described, and particularly pointed out in the claims.

In the accompanying drawings the same figures of reference indicate the same parts of the invention.

Figure 1:
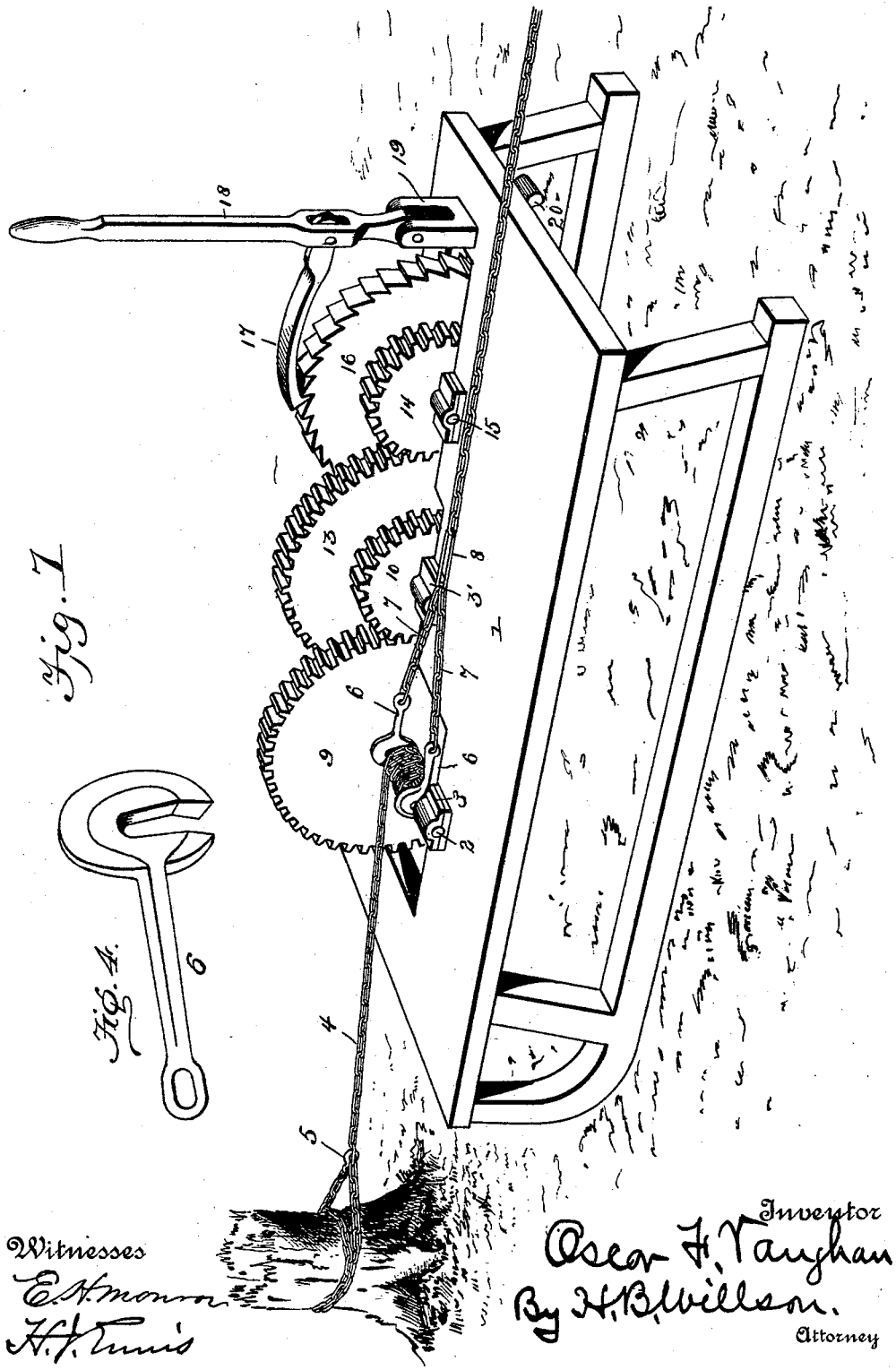
Figure 2:
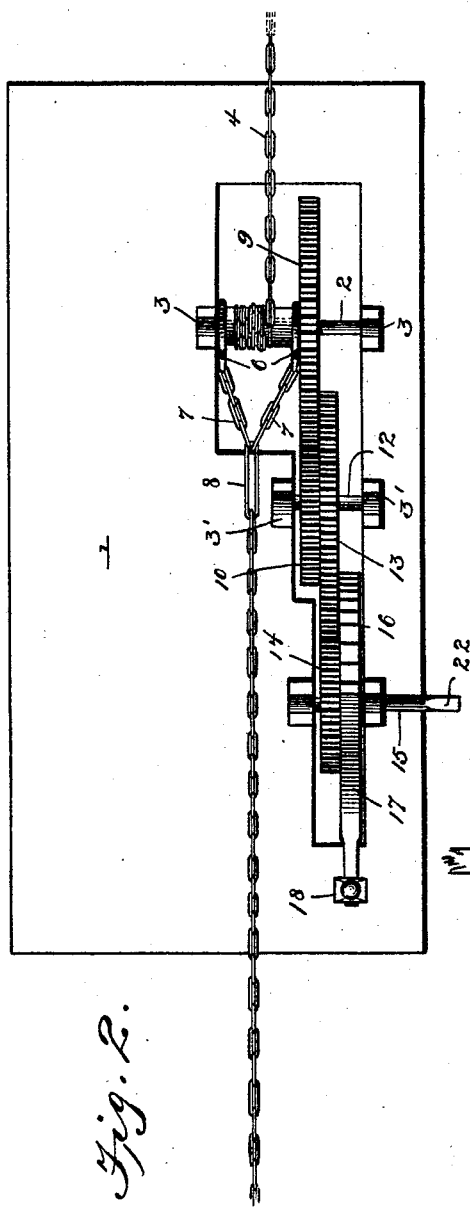
Figure 3:
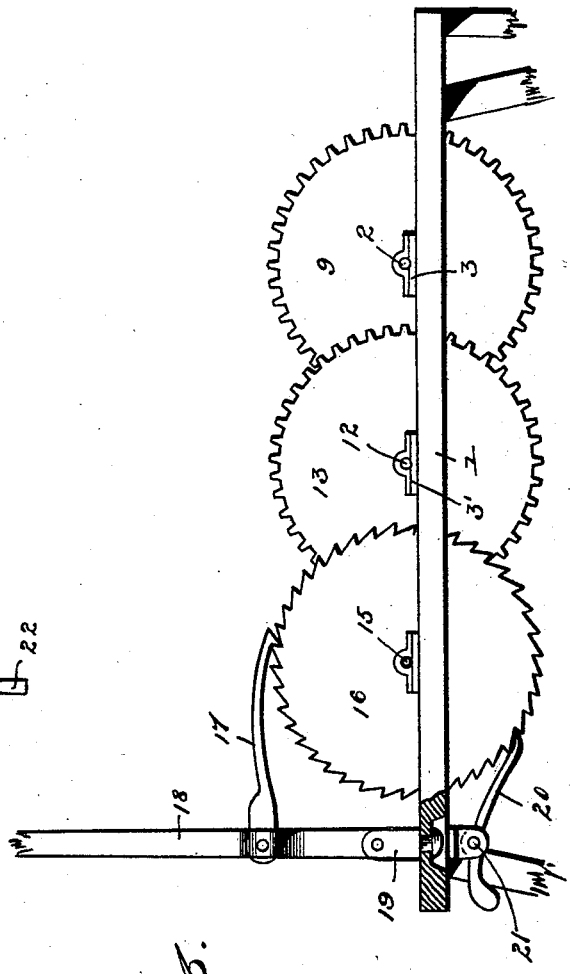

Figure 1 is a perspective view of my improved stump-extractor as it appears in operation. Fig. 2 is a top plan view, and Fig. 3 is a side elevation of the same. Fig. 4 is a detailed perspective of one of the flanged hooks.

1 represents a base or platform provided with diverging legs, the lower ends of which are secured to the runners on each side and parallel to each other for convenience in transporting the machine from place to place.

2 represents a stout shaft journaled in the boxes 3 3, secured to the platform 1. One end of a chain 4 is secured to said shaft, and the free end of the chain is provided with a grappling-hook 5 for securing it directly to a root of the stump, or the end of the chain may be passed around the stump and the hook made fast to the body of the chain, as shown in Fig. 1.

6 6 represent two flanged hooks engaging the shaft 2 on each side of the chain 4, and from each of these hooks a chain 7 runs back and is connected to a link 8, and from the link 8 a single chain extends rearwardly, its free end being suitably secured to a tree, stump, or other suitable anchorage in line with the stump to be extracted.

The flanges of the hooks 6 serve to guide the chains on the drum and to prevent them slipping or being wound off the ends of the drum and being tangled with the gearing.

9 represents a large gear-wheel rigidly mounted on the shaft 2, and a pinion 10 on a second shaft 12, journaled in boxes 3' 3', meshes with the large gear-wheel 9. The large gear-wheel 13 on said shaft 12 is in mesh with a pinion 14 on the driving-shaft 15, and this shaft is likewise provided with a ratchet-wheel 16, which is operated by a pawl 17, pivoted in a hand-lever 18, fulcrumed in a block 19, swiveled in the platform.

20 represents a stationary retaining-pawl pivoted on a bolt 21 in lugs on the platform, and it retains the ratchet-wheel when the strain is on the train of gearing.

One end of the shaft 15 is formed with a square shank 22 to receive a winch, (not shown,) to which power may be applied to extract small stumps or to set up the slack in the chain preparatory to using the more powerful lever 18. When the winch is used to wind up the chain, the lever may be turned so as to bring its pawl 17 out of engagement and away from the gear 16. This is accomplished by swiveling the block 19 in the frame of the machine.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

1. A stump-extractor, comprising the platform, the shaft 2 journaled therein the gear-wheel 9, pinion 10 and chain 4 having a grappling-hook 5, and the double chain 7 flanged hooks 6 6 connected to said double chain and detachably secured to said shaft, in combination with a train of gearing, a ratchet-wheel, a retaining-pawl, and an operating-pawl 17 pivoted in a hand-lever 18 fulcrumed in a block 19 swiveled in the platform, substantially as and for the purpose set forth.

2. A stump-extractor comprising a platform, shaft 2 journaled therein, a gear-wheel, a chain connected at one end to said shaft, a ratchet-wheel, a series of intermediate gears, a retaining-pawl engaging said ratchet-wheel, a block swiveled in the platform, a hand-lever fulcrumed in said block, and a pawl pivoted to said lever, substantially as set forth.

In testimony whereof I hereunto affix my signature in presence of two witnesses.

OSCAR FLEMING VAUGHAN.

Witnesses:
J. S. CAROTHERS,
C. R. PORTER.